(12) United States Patent
Essaki et al.

(10) Patent No.: US 7,985,704 B2
(45) Date of Patent: Jul. 26, 2011

(54) METHOD OF REGENERATING ABSORBENT

(75) Inventors: Kenji Essaki, Kawasaki (JP); Takehiko Muramatsu, Yokohama (JP); Masahiro Kato, Naka-gun (JP); Yasuhiro Kato, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 810 days.

(21) Appl. No.: 12/044,563

(22) Filed: Mar. 7, 2008

(65) Prior Publication Data

US 2008/0227626 A1 Sep. 18, 2008

(30) Foreign Application Priority Data

Mar. 9, 2007 (JP) .................................. 2007-060661

(51) Int. Cl.
*B01J 38/04* (2006.01)
(52) U.S. Cl. ............................. 502/34; 502/55; 502/514
(58) Field of Classification Search .................... 502/34, 502/55, 56, 514
See application file for complete search history.

(56) References Cited

U.S. PATENT DOCUMENTS

| 6,387,845 | B1 | 5/2002 | Masahiro et al. | 502/407 |
| 6,712,879 | B2 | 3/2004 | Kato et al. | 95/139 |
| 2003/0232722 | A1 | 12/2003 | Kato et al. | 502/411 |
| 2005/0214203 | A1 | 9/2005 | Essaki et al. | 423/651 |
| 2007/0072768 | A1 | 3/2007 | Essaki et al. | 502/400 |
| 2007/0072769 | A1 | 3/2007 | Imada et al. | 502/411 |
| 2007/0092435 | A1 | 4/2007 | Essaki et al. | 423/648.1 |
| 2007/0224111 | A1 | 9/2007 | Essaki et al. | 423/652 |
| 2007/0238611 | A1 | 10/2007 | Imada et al. | 502/400 |

FOREIGN PATENT DOCUMENTS

JP    10-152302    6/1998

OTHER PUBLICATIONS

Takenaka, Proceedings of Salayu-gakkai Shin-enerugi Bukai Koenkai, pp. 57-62, 2006.
Iwasaki, et al., "Hydrogen Production from Ethanol Using a $CO_2$ Absorption Ceramic and Base Metal Catalysts", Journal of Chemical Engineering of japan, vol. 39, No. 5, pp. 513-524, 2006.
Iwasaki, et al., "Non-Equilibrium Hydrogen Product from Ethanol Using $CO_2$ Absorption Ceramic and Precious Metal Catalysts", Journal of Chemical Engineering of Japan, vol. 40, No. 2, pp. 178-185, 2007.

*Primary Examiner* — Edward M Johnson
(74) *Attorney, Agent, or Firm* — Ohlandt, Greeley, Ruggiero & Perle, L.L.P.

(57) ABSTRACT

A method of regenerating an absorbent includes preparing a reactor having a gas inlet portion and a discharge portion, filling the reactor with a reforming catalyst and an absorbent for absorbing carbon dioxide, feeding the feedstock gas and the steam via the gas inlet portion to the reactor to allow a steam reforming reaction to take place, allowing the absorbent to absorb carbon dioxide generated with hydrogen at the steam reforming reaction, and releasing the carbon dioxide from the absorbent after the carbon dioxide absorption capacity of the absorbent has been degraded. In this method, the temperature in an inside of the reactor is set to 625° C. or more at the release of the carbon dioxide, and an inert gas is fed via the discharge portion to the reactor.

11 Claims, 2 Drawing Sheets

METHOD OF REGENERATING ABSORBENT

CROSS-REFERENCE TO RELATED APPLICATIONS

This application is based upon and claims the benefit of priority from prior Japanese Patent Application No. 2007-060661, filed Mar. 9, 2007, the entire contents of which are incorporated herein by reference.

BACKGROUND OF THE INVENTION

1. Field of the Invention

This invention relates to a method of regenerating absorbent. More specifically, this invention relates to a method of regenerating an absorbent to be employed in a reformer filled with a reforming catalyst and an absorbent containing lithium silicate for generating hydrogen, thereby enabling the absorbent to recovery its absorption properties.

2. Description of the Related Art

Since hydrogen ($H_2$) to be generally employed as the fuel for a fuel cell is not abundant in nature, it is generally produced by means of steam reforming method wherein a fossil fuel such as methane or kerosene is employed as a raw material and reacted with steam ($H_2O$) heated to high temperatures in the presence of a reforming catalyst. In a case where methane ($CH_4$) which is a major component of natural gas and town gas is employed as a feedstock gas for example, this steam reforming method can be represented by the following reaction formula:

$$CH_4 + 2H_2O \leftrightarrow 4H_2 + CO_2 \quad (1)$$

Recently, there has been also studied to produce hydrogen from a raw material constituted by ethanol ($C_2H_5OH$) which is now attracting much attention as a renewable energy source that can be produced from plants (see F. Frusteri et al., Journal of Power Sources, 132, 139 [2004]). The steam reforming reaction wherein ethanol is employed as a feedstock can be represented by the following reaction formula:

$$C_2H_5OH + 3H_2O \leftrightarrow 6H_2 + 2CO_2 \quad (2)$$

These reactions however are deficient in that a large number of by-products are generated, so that the production gas contains such impurities as methane, carbon monoxide (CO), and carbon dioxide ($CO_2$). In particular, the production gas present immediately after the steam reforming reaction contains carbon monoxide at a volume ratio ranging from several percent to several tens of percent, the exact ratio depending on the reaction conditions and the raw materials. For this reason, a carbon monoxide (CO) converter is generally connected to the downstream end of the reactor (see "The Front of Hydrogen Energy" (2003), page 36, Industry Research Group). The production gas that has been treated by means of this CO converter contains carbon monoxide which has been reduced in concentration down to 0.5% by volume and is subsequently transferred to a gas-refining process.

JP-A 10-152302 (KOKAI) and JP-A 2002-274809 (KOKAI) disclose, respectively, a method for efficiently producing hydrogen, wherein lithium composite oxide acting as an inorganic absorbent is employed in addition to the conventional reforming catalyst in the steam reforming reaction accompanying the generation of $CO_2$ as a by-product, thereby making it possible to remove $CO_2$ from a high-temperature reaction cite heated above 400° C. and to shift the chemical equilibrium thereof toward the main product-generating side. Among the lithium containing oxides, lithium silicate is most suited to shifting the chemical equilibrium in this manner since it is capable of absorbing $CO_2$ especially at a high rate.

The absorption of $CO_2$ by lithium silicate can be represented by the following reaction formula:

$$Li_4SiO_4 + CO_2 \leftrightarrow Li_2CO_3 + Li_2SiO_3 \quad (3)$$

In reaction formula (3), when the reaction in the rightward direction takes place, $CO_2$ is allowed to react with and absorbed by lithium silicate. As set forth by M. Kato et al., in Journal of Ceramics Society of Japan, 113(3), 252 (2005); by Essaki et al., in the Proceedings of 15th Meeting of the Japan Institute of Energy (2006); and by Suzuki et al., in the Proceedings of 37th Autumn Meeting of Society of Chemical Engineers, Japan (2005), it has been confirmed experimentally that, in the cases of methane and ethanol, it is possible to shift the equilibrium of the reaction with high-temperature steam and so promote the generation of hydrogen while reducing the concentration of carbon monoxide by-product.

However, experiments by the present inventors investigate that when an absorbent consisting of lithium silicate co-exists with a reforming catalyst in the steam-reforming reaction cite of ethanol, carbon is deposited on the surface of the absorbent. The carbon of this kind is more likely to be produced as the number of carbon atoms per molecule in the feedstock gas increases, so that, in the case of a compound such as ethanol containing two carbon atoms or propane containing three carbon atoms, the deposition of carbon would become more prominent. Further, the quantity of deposition of carbon can be increased as the repeated use of the absorbent where $CO_2$ is enabled to be released to regenerate the absorbent. Since deposited carbon would cover the surface of absorbent to inhibit the reaction thereof, the absorption performance of the absorbent would be degraded. Therefore, in the regeneration of the absorbent, it is necessary to release $CO_2$ and, at the same time, to remove the carbon thus deposited from the absorbent.

As for the method for removing the deposited carbon, it is conceivable to employ, for example, a method wherein steam or air which is capable of reacting with carbon is passed through the absorbent. This method however is accompanied with various problems that, in the case of steam, it requires a lot of energy in order to vaporize water and, in the case of air, a high-temperature region is formed locally in the absorbent on oxidizing the carbon, thereby resulting in the sintering of catalyst and absorbent and hence resulting in the degradation in performance of absorbent.

Meanwhile, a method for continuously producing hydrogen is disclosed by K. Essaki et al. in Proceedings of 16th World Hydrogen Energy Conference (2006), wherein a plurality of reactors, each provided with an absorbent and filled with a reforming catalyst, are installed in a hydrogen-producing apparatus. In the case of the absorbent comprising lithium silicate, the release of $CO_2$ can be accomplished within 30 minutes at a temperature of 650° C. in a nitrogen atmosphere, so that a feedstock gas for reforming is permitted to flow in the same direction as the flow of nitrogen on regenerating the absorbent. Further, since it becomes more advantageous as the concentration of $CO_2$ in an atmosphere becomes lower with respect to the reaction equilibrium on regenerating the absorbent, it has been considered more advantageous to employ a method wherein nitrogen gas is passed through the absorbent. However, according to this document, since the feedstock gas employed therein is methane and hence the aforementioned deposition of carbon can hardly take place, the conditions for the regeneration are set, taking only the release of $CO_2$ into consideration.

According to Takenaka, Lectures by New Energy Section of Petroleum Society, pp. 58 (2006), there is a description with respect to the elimination of carbon that has been precipitated in a ceramic porous body having almost the same configuration as that of the absorbent, wherein the carbon is heated at a temperature of 650° C. in an atmosphere containing 50% by volume of carbon dioxide. The elimination of carbon according to this method can be performed according to the following reaction formula:

$$C + CO_2 \leftrightarrow 2CO \tag{4}$$

Due to the equilibrium, this reaction is enabled to work more advantageously in the elimination of carbon as the concentration of $CO_2$ in the atmosphere becomes higher. However, when the aforementioned elimination of $CO_2$ from the absorbent is taken into account, this reaction contradicts to the $CO_2$-eliminating conditions. It has been confirmed by the present inventors from the experiments wherein an absorbent consisting of lithium silicate was heated at a temperature of 650° C. in an atmosphere containing 50% by volume of carbon dioxide that it was almost impossible to release $CO_2$ and hence the regeneration of the absorbent could hardly be achieved.

BRIEF SUMMARY OF THE INVENTION

According to the present invention, there is provided a method of regenerating an absorbent comprising:

preparing a reactor having opened opposite ends, one end of which being connected to a gas inlet portion for introducing a feedstock gas and steam and the other end being connected to a discharge portion of reforming reaction gas;

filling the reactor with a reforming catalyst and an absorbent comprising lithium silicate for absorbing carbon dioxide;

feeding the feedstock gas and the steam via the gas inlet portion to the interior of the reactor to allow a steam reforming reaction to take place;

allowing the absorbent to absorb carbon dioxide generated with hydrogen at the steam reforming reaction; and releasing the carbon dioxide from the absorbent after the carbon dioxide absorption capacity of the absorbent is degraded;

wherein temperature in an inside of the reactor is set to 625° C. or more at the release of the carbon dioxide, and an inert gas or a mixed inert gas containing not more than 5% by volume of carbon dioxide is employed as a treatment gas and fed via the discharge portion to the interior of the reactor in a manner that the direction of flow of the treatment gas is opposite to the feeding direction of the feedstock gas and the steam.

Herein, the expression that "the carbon dioxide absorption capacity of the absorbent is degraded" means a situation where the absorption of carbon dioxide by the absorbent has reached to 20 to 100%.

DETAILED DESCRIPTION OF THE INVENTION

Next, the method of regenerating the absorbent according to the embodiments of the present invention will be explained in detail as follows.

Figure 1:
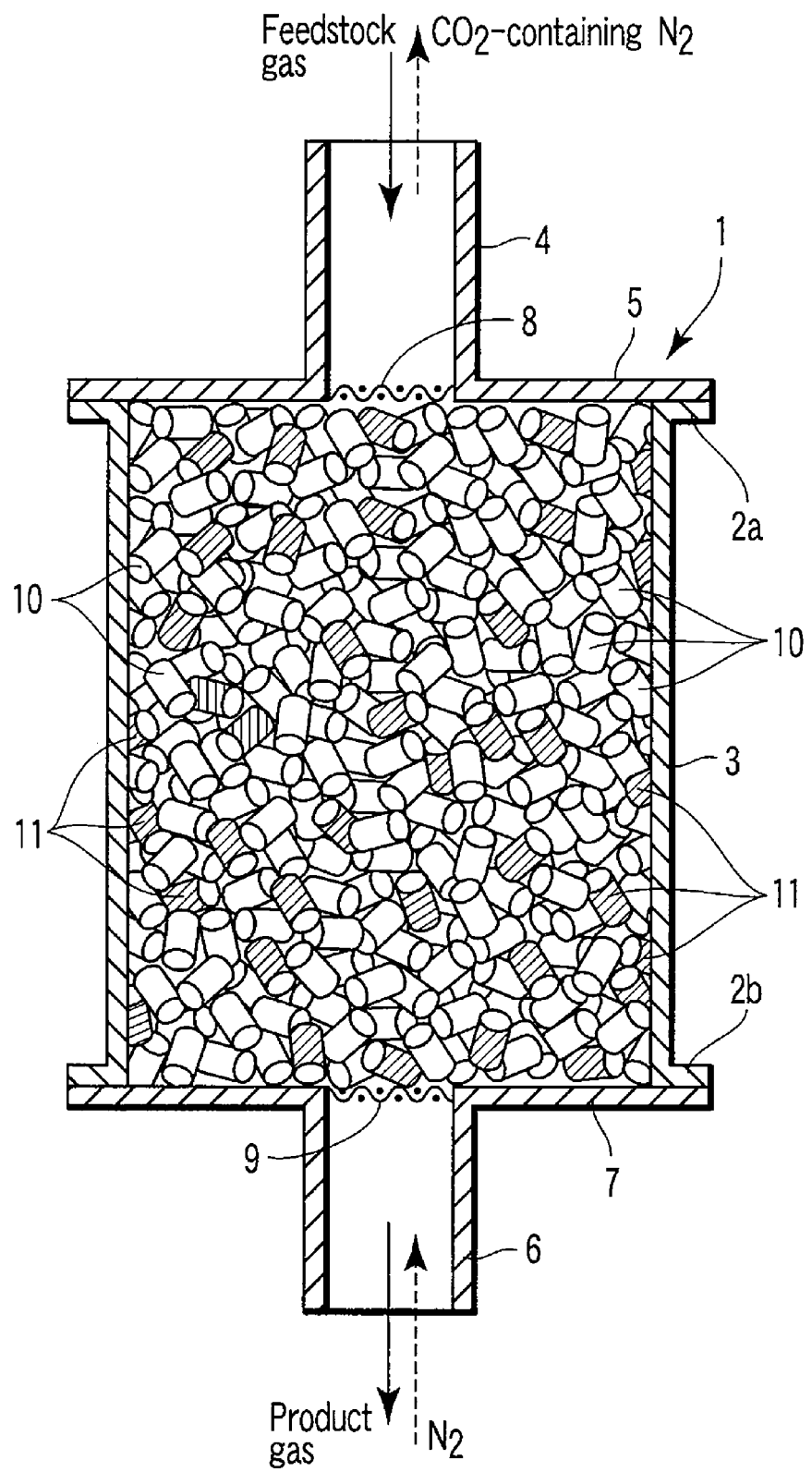
FIG. 1 is a cross-sectional view schematically illustrating a reformer according to one embodiment.

FIG. 1 is a cross-sectional view schematically illustrating a reformer according to one embodiment. A reformer 1 is equipped with a cylindrical reactor 3 having flanges 2a, 2b on the opposite ends thereof, respectively, with a disc-like top cap 5 designed to be contacted with the flange 2a formed at one end (upper end) of the reactor 3 and having a gas inlet tube 4 for introducing a feedstock gas and steam, and with a disc-like bottom cap 7 designed to be contacted with the flange 2b formed at the other end (lower end) of the reactor 3 and having a discharge tube 6 for discharging a production gas. The flanges 2a, 2b of the reactor 3 are respectively provided with a plurality of bolt-insertion holes (not shown) and the disc-like caps 5 and 7 are also respectively provided with a plurality of bolt-insertion holes (not shown), each corresponding in position with the first mentioned bolt-insertion holes. Thus the disc-like caps 5 and 7 are respectively designed to be fixed to the reactor 3 by inserting a bolt into each of the bolt-insertion holes formed through the alignment between the flange 2a and the disc-like upper cap 5 and between the flange 2b and the disc-like bottom cap 7 and then by clamping them by making use of a nut.

The opening of the gas inlet tube 4 which is formed in the disc-like upper cap 5 is provided with a mesh 8 and the opening of production gas discharge tube 6 which is formed in the disc-like bottom cap 7 is also provided with a mesh 9. The reactor 3 is filled therein with a reforming catalyst 10 and with an absorbent 11 comprising lithium silicate for absorbing carbon dioxide.

It should be noted that a heating component (not shown) for enabling a combustion gas heated, for example, up to a predetermined temperature is attached to the outer circumferential wall of the reactor 3 as well as to a portion of the outer circumferential wall of the gas inlet tube 4 and to a portion of the outer circumferential wall of the discharge tube 6.

Next, the method of regenerating the absorbent according to one embodiment will be explained with reference to the reforming reaction apparatus shown in FIG. 1.

For example, the vapor of an aqueous solution of ethanol that has been obtained through the evaporation of the aqueous solution of ethanol is passed through the interior of cylindrical reactor 3 by way of down-flow, thereby enabling the vapor to contact with the reforming catalyst 10 and the absorbent 11 both loaded in the reactor 3. On this occasion, the temperature inside the reactor 3 is raised to a desired level by passing combustion gas through the heating component (not shown). As a result of the introduction of the vapor of aqueous ethanol solution into the reactor 3 and the heating by the heating component, ethanol is subjected to a steam reforming reaction according to reaction formula (2) under the presence of the reforming catalyst 10, thereby generating mainly hydrogen and carbon dioxide ($CO_2$). At the same time, $CO_2$ is permitted to react with the absorbent (for example, lithium silicate) 11 loaded in advance together with the reforming catalyst 10 according to reaction formula (3), thereby allowing to absorb and remove $CO_2$. As a result, the reaction according to reaction formula (2) is promoted to generate efficient amount of hydrogen. The hydrogen thus created is recovered through the discharge tube 6.

When the $CO_2$ absorption capacity of the absorbent is degraded in the process for enabling the absorbent to absorb the $CO_2$ that has been generated by performing the reforming reaction of the vapor of aqueous ethanol solution in the reformer 1, the supply of the vapor of aqueous ethanol solution is stopped. On this occasion, the vapor of aqueous ethanol solution flowing through the reactor 3 by way of down-flow in the process of steam reforming is decomposed more prominently at an upper portion of reactor 3 which is located close to the gas inlet tube 4, thus enabling carbon to deposit more easily on this surface region of absorbent. Namely, the carbon would be most prominently deposited at an upper portion of reactor 3. Then, combustion gas is passed through the heating component (not shown) to raise the temperature in an inside of the reactor 3 up to 625° C. or more to heat the absorbent 11 filled in the reactor 3. While maintaining this heated temperature, an inert gas (for example, nitrogen gas), i.e., a treatment gas, is passed through the discharge tube 6 from the bottom to the top thereof. Namely, the inert gas is passed through the reactor 3 by way of up-flow which is opposite to the feeding direction (down-flow) of the vapor of aqueous ethanol solution.

On this occasion, since the reaction between $CO_2$ and lithium silicate is a reversible reaction as shown in reaction formula (3), $CO_2$ can be released from the absorbent at a temperature of 625° C. or more under the condition where nitrogen gas is continued to flow, thereby making it possible to regenerate the absorbent. Due to the up-flow of treatment gas (for example, nitrogen) inside the reactor 3, the concentration of $CO_2$ in the treatment gas introduced from the bottom of reactor 3 gradually increases as the treatment gas moves toward the top of reactor 3. Because of this, the concentration of $CO_2$ in the treatment gas becomes higher at an upper portion of reactor 3 where carbon is permitted to deposit most prominently. As a result, the carbon that has been deposited on the surface of absorbent is enabled to react with $CO_2$ at a temperature of 625° C. or more according to reaction formula (4), thereby making it possible to effectively remove the carbon. Therefore, the absorbent thus regenerated is prevented from being degraded in the reaction thereof with $CO_2$ as well as the absorption performance thereof that may occur through deposition of carbon.

It should be noted that when the flow of treatment gas on regenerating the absorbent is directed to the same direction as the feeding direction of feedstock gas and steam for the reforming reaction (for example, both flows being down-flow), the treatment gas is introduced into the reactor 3 from the top of reactor 3 where carbon can be more readily precipitated due to the decomposition of feedstock gas due to the reforming reaction and hence the deposition of carbon would become highest in quantity. For this reason, the concentration of $CO_2$ that can be released from the absorbent would become higher at the lower portion of reactor 3 rather than at the upper portion thereof where a large quantity of carbon is deposited. Namely, it would become difficult to sufficiently increase the concentration of $CO_2$ that can be released from the absorbent at the upper portion of reactor 3 where a large quantity of carbon is deposited. Further, when the treatment gas is introduced into the reactor 3 from the top thereof where the deposition of carbon would become highest in quantity due to the decomposition of feedstock gas, the temperature of the upper portion of reactor 3, where the deposition of carbon is highest in quantity, would be lowered more or less. For these reasons, it may become difficult to efficiently eliminate the carbon that has been deposited on the absorbent.

After finishing the regeneration, the vapor of aqueous ethanol solution is again fed to the reactor 3 of the reformer 1 to perform the reforming reaction.

Examples of the feedstock gas can be used a fossil fuel gas such as methane or kerosene instead of vaporized ethanol. It is particularly advantageous to employ a feedstock gas containing a large number of carbon atoms per molecule, such as vaporized ethanol, which makes it possible to increase the deposition of carbon on the surface of absorbent on regenerating the absorbent according to this embodiment.

The reforming catalyst having a structure, where catalytic metal fine particles are carried on a support, can be used. The support can be used, for example, alumina, magnesia, ceria, lanthanum oxide, zirconia, silica, titania, etc. The catalytic metal can be used, for example, nickel, ruthenium, rhodium, palladium, platinum, cobalt, etc. Among them, nickel and rhodium are more preferable for use.

Examples of absorbent can be used single substance of lithium silicate or a mixture consisting of lithium silicate and an alkaline compound such as alkaline carbonate (such as potassium carbonate or sodium carbonate) and alkaline oxide. The lithium silicate is represented by $Li_xSi_yO_z$ (wherein x+4y−2z=0) for example. Examples of the lithium silicate represented by this formula include, for example, lithium orthosilicate ($Li_4SiO_4$), lithium metasilicate ($Li_2SiO_3$), $Li_6Si_2O_7$, $Li_8SiO_6$, etc.

The mixing ratio between the reforming catalyst and the absorbent is preferably the range of 1:1 to 1:8 (weight ratio) though it depends on the kind and configuration of these materials.

The reforming catalyst and the absorbent should preferably be configured as particles or pellets, the size (especially, the diameter) thereof being limited to 2-10 mm. If the size is less than 2 mm, the pressure loss due to the passing flow of feedstock and steam would become prominent, possibly degrading the efficiency of hydrogen production. On the other hand, if the size is greater than 10 mm, the diffusion of various gases inside the absorbent would become rate-limiting, thus making reaction difficult.

The absorbent should preferably be formed of a porous body constituted by primary particles ranging in size from 2 to 50 μm. The absorbent formed of such a porous body is capable of exhibiting high reactivity with $CO_2$.

The inert gas to be employed as the treatment gas can be used a gas other than nitrogen such as argon, helium. The treatment gas may be constituted by an inert gas containing not more than 5% by volume of carbon dioxide ($CO_2$). If the amount of carbon dioxide in the treatment gas is greater than 5% by volume, it may become difficult to sufficiently eliminate $CO_2$ on regenerating the absorbent.

When the heating temperature in an inside of the reactor is lower than 625° C. on regenerating the absorbent, it may become difficult to remove the carbon that has been deposited on the surface of absorbent within the period of regeneration. The upper limit of the heating temperature should preferably be 720° C. If the heating temperature is higher than 720° C., the lithium carbonate ($Li_2CO_3$) that has been produced according to reaction formula (3) would be liquefied, thereby promoting the sintering of the primary particles constituting the absorbent and hence possibly degrading the absorption performance of absorbent as the absorbent is repeatedly used.

Figure 2:
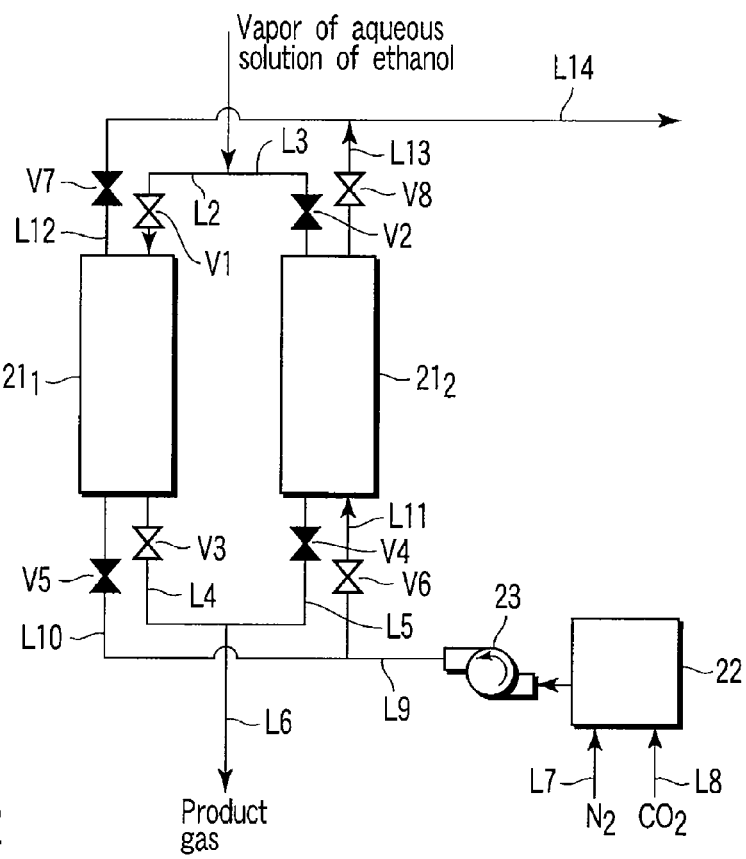
FIG. 2 is a flow chart illustrating a reforming/regenerating system according to one embodiment (i.e., a state wherein the steam reforming of ethanol is being carried out in a first reactor and the regeneration is being carried out in a second reactor)
Figure 3:
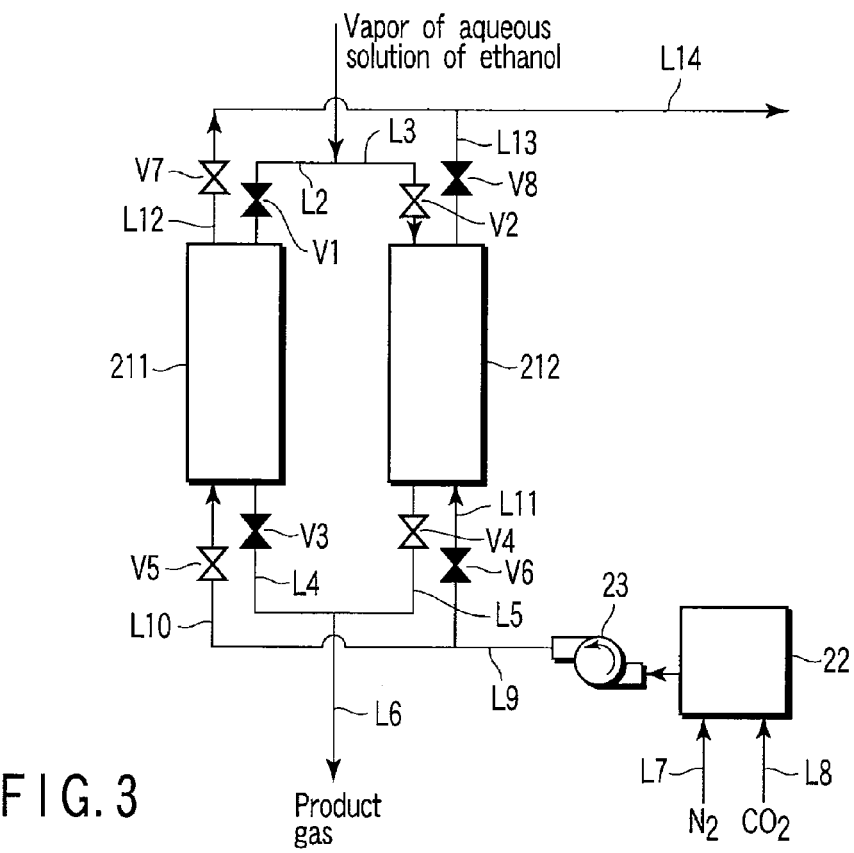
FIG. 3 is a flow chart illustrating the same reforming/regenerating system as that shown in FIG. 2 (this figure however shows a state wherein the regeneration is being carried out in the first reactor and the steam reforming of ethanol is being carried out in the second reactor).

Continuous operation for the aforementioned reforming reaction and regenerating reaction can be achieved by juxtaposing two columns of reactors as shown in FIGS. 2 and 3. FIGS. 2 and 3 respectively show a flowchart illustrating the reforming/regenerating system. It should be noted that FIGS. 2 and 3 both show the same reforming/regenerating system, but the steam reforming reaction and the regeneration of absorbent by means of this couple of reactors are reversed.

A first reactor $21_1$ and a second reactor $21_2$, both having opened opposite ends, are respectively filled with a reforming catalyst and an absorbent comprising lithium silicate. A cylindrical heater (not shown) is disposed on the outer circumferential wall of each of these reactors $21_1$ and $21_2$.

A feedstock supply line L1 is branched at an intermediate portion thereof into a couple of feedstock supply branches L2 and L3. One feedstock supply branch L2 is connected with a top portion of the first reactor $21_1$ and the other feedstock supply branch L3 is connected with a top portion of the second reactor $21_2$. These feedstock supply branches L2 and L3 are provided with on-off valves V1 and V2, respectively. A pair of production gas discharge lines L4 and L5 are provided such that they are connected, through one end thereof, with bottom portions of first reactor $21_1$ and the second reactor $21_2$, respectively, and also connected, through the other end (lower end) thereof, with a single main production gas discharge line L6. These production gas discharge lines L4 and L5 are provided with on-off valves V3 and V4, respectively.

There is disposed a treatment gas port 22 to which an inert gas inlet line L7 and a carbon dioxide ($CO_2$) inlet line L8 are respectively connected. There is also disposed a treatment gas supply line L9 in such a manner that one end thereof is connected with the treatment gas port 22 and the other end thereof is branched into a couple of treatment gas branches L10 and L11. The treatment gas branch L10 is connected with a bottom portion of the first reactor $21_1$ and the treatment gas branch L11 is connected with a bottom portion of the second reactor $21_2$. The treatment gas supply line L9 is provided with a blower 23. These treatment gas branches L10 and L11 are provided with on-off valves V5 and V6, respectively. A couple of treatment gas discharge lines L12 and L13 are provided such that they are connected, through one end thereof, with top portions of first reactor $21_1$ and the second reactor $21_2$, respectively, and also connected, through the other end (upper end) thereof, with a single treatment gas integral discharge line L14. These treatment gas discharge lines L12 and L13 are provided with on-off valves V7 and V8, respectively.

Next, the reforming/regenerating method by means of the reforming/regenerating system provided with a couple of reactors as described above will be explained as follows.

First of all, the on-off valves V2, V4, V5 and V7 attached to the feedstock branch L3, the production gas discharge line L5, the treatment gas branch L11 and the treatment gas discharge line L13, respectively, are closed. Then, all of the on-off valves V1, V3, V6 and V8 other than the on-off valves V2, V4, V5 and V7 are opened. It should be noted that in FIG. 2, the on-off valves thus closed are represented by the blackened symbol and the on-off valves thus opened are represented by the void symbol.

For example, the vapor of aqueous ethanol solution which has been obtained through the evaporation of a solution consisting of ethanol and water is fed, by way of down-flow and via the feedstock supply line L1 and the feedstock supply branch L2, to the first reactor $21_1$, thereby enabling the vapor of aqueous ethanol solution to contact with the reforming catalyst and the absorbent comprising lithium silicate, which are loaded in advance in the first reactor $21_1$. On this occasion, by means of a cylindrical heater (not shown), the interior of the first reactor $21_1$ is heated up to a desired temperature. Due to the introduction of the vapor of aqueous ethanol solution into the first reactor $21_1$ and the heating of the vapor of aqueous ethanol solution, a steam reforming reaction is permitted to take place in the presence of the reforming catalyst and according to reaction formula (2), thereby generating hydrogen and carbon dioxide. Concurrently, $CO_2$ is allowed to react with the absorbent (for example, lithium silicate) 11 loaded therein together with the reforming catalyst according to reaction formula (3), thereby allowing to absorb and to remove $CO_2$. As a result, the reaction according to reaction formula (2) is promoted to generate an efficient amount of hydrogen. The hydrogen thus produced is recovered through the production gas discharge line L4 and the discharge tube 6.

During this process of manufacturing hydrogen by way of the steam reforming reaction inside first reactor $21_1$, the regeneration process is performed in the second reactor $21_2$ which is filled with the reforming catalyst and the absorbent that has already absorbed a sufficient quantity of $CO_2$ and been degraded in its $CO_2$-absorbing capacity. Namely, by means of a cylindrical heater (not shown), the interior of the second reactor $21_2$ is heated up to 625° C. or more. An inert gas (treatment gas), e.g., nitrogen is introduced, via the inert gas inlet line L7, into the treatment gas port 22 and then the blower 23 is actuated to introduce the nitrogen, via the treatment gas supply line L9, the treatment gas branch L10 and the a bottom portion of the second reactor $21_2$, into the interior of second reactor $21_2$. Namely, the nitrogen is introduced into the interior of second reactor $21_2$ by up-flow (i.e., a flow from bottom to top) which is quite opposite to the direction of flow (down-flow) of the vapor of aqueous ethanol solution which is directed from the top to the bottom of the first reactor $21_1$. On this occasion, since the reaction between $CO_2$ and lithium silicate is a reversible reaction as shown in reaction formula (3), $CO_2$ can be released from the absorbent. Concurrently, the carbon that has been deposited on the surface of absorbent can be effectively removed as described above, thus achieving the regeneration of absorbent. The nitrogen gas containing $CO_2$ can be discharged out of the system through the treatment gas discharge line L13 and the production gas discharge line L4.

In the aforementioned process of manufacturing hydrogen by way of the steam reforming reaction inside first reactor $21_1$, when the $CO_2$-absorbing capacity of the absorbent loaded therein is degraded by the absorption of $CO_2$, the on-off valves V2, V4, V5 and V7 attached to the feedstock branch L3, the production gas discharge line L5, the treatment gas branch L11 and the treatment gas discharge line L13, respectively, are opened. Then, all of the on-off valves V1, V3, V6 and V8 other than the on-off valves V2, V4, V5 and V7 are closed. It should be noted that in FIG. 3, the on-off valves thus closed are represented by the blackened symbol and the on-off valves thus opened are represented by the void symbol. By way of this on-off operation of these on-off valves, the supply of the vapor of aqueous ethanol solution is switched to the second reactor $21_2$ and the supply of the treatment gas is switched to the first reactor $21_1$. Then, the interior of the first reactor $21_1$ is heated up to 625° C. or more, thereby making it possible to concurrently perform the production of hydrogen through the steam reformation of ethanol and the regeneration of the absorbent.

Therefore, since the production of hydrogen can be performed in one of the first and second reactors $21_1$ and $21_2$ and, at the same time, the operation of regenerating the absorbent can be performed in the other reactor alternately, it is possible to substantially continuously perform the production of hydrogen.

It should be noted that the method of regenerating the absorbent shown in FIGS. 2 and 3 can be modified in such a manner that $CO_2$ is introduced from the carbon dioxide inlet line L8 into the treatment gas inlet port 22 and then mixed with an inert gas (for example, nitrogen gas) that has been introduced from the inert gas inlet line L7 to thereby create a composite nitrogen gas containing not more than 5% by volume of $CO_2$ for using it as a treatment gas.

Further, the feeding of feedstock gas and steam for the reforming reaction and the feeding of the treatment gas for regeneration should be simply controlled such that their directions of flow are opposite to each other inside the reformer (for example, the reactor). For example, if the former flow is down-flow, the latter flow should be up-flow, and if the former flow is up-flow, the latter flow should be down-flow.

As explained above, according to the regeneration method set forth in this embodiment, the steam reforming reaction can be performed by introducing the feedstock gas and steam into the reactor and the $CO_2$ that has been generated concurrent with the production of hydrogen can be absorbed by the absorbent, wherein when the carbon dioxide-absorbing capacity of the absorbent has been degraded, it can be regenerated by removing the carbon that has been deposited on the surface of the absorbent concurrent with the release of carbon dioxide from the absorbent, thereby making it possible to retain the absorbing capacity of the absorbent to absorb the $CO_2$ that has been generated in the steam reforming reaction. Therefore, it is now possible to enhance the efficiency of hydrogen production.

Specific examples of the present invention will be explained in detail as follows.

Example 1

10 g of a reforming catalyst and 60 g of an absorbent were mixed together to form a mixture, which is then placed in the reactor 3 (0.02 m in inner diameter and 0.9 m in height) of the reformer 1 shown in FIG. 1, thus forming a column of the mixture having a height of 0.3 m. Alumina particles having an average particle diameter of 3 mm and carrying about 20% by weight of nickel was employed as the reforming catalyst. Lithium silicate powder was press-molded to obtain a green compact (porous body) having a diameter of 5 mm and a length of 5 mm, which was employed as the absorbent.

The vapor of aqueous ethanol solution comprising a mixture consisting of ethanol and water (1:6 in molar ratio) was fed, via the gas inlet tube 4, into the reactor 3 by way of down-flow (i.e., from the top to the bottom) at a flow rate of 0.25 L/min (calculated as the standard state of gas). The temperature of the reactor 3 was set to 600° C. and the inner pressure thereof was set to 500 kPa. While maintaining these conditions, the reforming was performed for 30 minutes.

Subsequently, nitrogen gas (treatment gas) was fed, via the discharge tube 6, into the reactor 3 by way of up-flow (i.e., from the bottom to the top) at a flow rate of 2.5 L/min (calculated as the standard state of gas) to perform the regeneration of the absorbent. The temperature of the reactor 3 was set to 650° C. and the inner pressure thereof was set to 101 kPa, and these conditions were maintained for 30 minutes. The above-described reforming and regeneration were repeated 100 times.

Example 2

By making use of the same method as described in Example 1 except that the temperature inside the reactor in the step of regeneration was changed to 700° C., the reforming and regeneration were repeated 100 times.

Example 3

By making use of the same method as described in Example 1 except that a mixed nitrogen gas containing 5% by volume of carbon dioxide was employed as the treatment gas and the temperature inside the reactor in the step of regeneration was changed to 650° C., the reforming and regeneration were repeated 100 times.

Comparative Example 1

By making use of the same method as described in Example 1 except that the feeding direction of nitrogen gas was changed to the same as that of the vapor of aqueous ethanol solution, i.e., by way of down-flow (from the top to the bottom), in the step of regeneration, the reforming and regeneration were repeated 100 times.

Comparative Example 2

By making use of the same method as described in Example 1 except that the temperature inside the reactor in the step of regeneration was changed to 600° C., the reforming and regeneration were repeated 100 times.

The absorption capacity of the absorbent obtained in Examples 1, 2 and 3 and Comparative Examples 1 and 2 was measured. In this measurement, there was employed a thermogravimetric analyzer (TG) wherein a mixed gas consisting of 90% by volume of oxygen and 10% by volume of carbon dioxide were enabled to flow under the conditions of: 101 kPa and 0.2 L/min (calculated as the standard state of gas). In this measuring method, nitrogen gas (inert gas) was kept to flow therein under the conditions of: 101 kPa and 0.2 L/min and the temperature was increased at a rate of 30° C./min from room temperature to 600° C., which temperature was maintained for 20 minutes. Thereafter, the passing gas was changed from nitrogen gas to the aforementioned mixed gas and then maintained the conditions for 30 minutes. By doing this experiment, the ratio of increase in weight due to the absorption of carbon dioxide by the absorbent of these examples was investigated.

Further, the color of absorbent after 100 times of the repetition of reforming and regeneration was visually observed.

The results thus obtained are shown in the following Table 1. It should be noted that Table 1 also shows the ratio of increase in weight due to the absorption of carbon dioxide by the absorbent (initial ratio of increase in weight) and the color of absorbent before the repetition of reforming and regeneration.

TABLE 1

| | Ratio of increase in weight (%) | | Color | |
| --- | --- | --- | --- | --- |
| | Initial ratio | After repetition of reforming and regeneration | Initial color | After repetition of reforming and regeneration |
| Example 1 | 17.0 | 16.7 | White | White |
| Example 2 | 17.0 | 16.0 | White | White |
| Example 3 | 17.0 | 16.5 | White | White |
| Comparative Example 1 | 17.0 | 12.0 | White | Gray |
| Comparative Example 2 | 17.0 | 3.0 | White | Black |

As apparent from Table 1, according to the methods of regenerating the absorbent according to Examples 1-3, the ratio of increase in weight was close to the initial ratio of increase in weight, thus indicating that these absorbent were capable of maintaining high carbon dioxide-absorption performance. Further, the color of absorbent after the repetition of reforming and regeneration was retained as white as that of the initial absorbent.

Whereas, according to the methods of regenerating the absorbent in Comparative Examples 1 and 2, the ratio of increase in weight was decreased greatly from the initial ratio of increase in weight, thus indicating that the absorption performance of these absorbent was prominently degraded. Moreover, the color of absorbent of Comparative Examples 1 and 2 after the repetition of reforming and regeneration was respectively changed to gray and black due to the adhesion of carbon.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of regenerating an absorbent comprising:
preparing a reactor having opened opposite ends, one end of which being connected to a gas inlet portion for introducing a feedstock gas and steam and the other end being connected to a discharge portion of reforming reaction gas;
filling the reactor with a reforming catalyst and an absorbent comprising lithium silicate for absorbing carbon dioxide;
feeding the feedstock gas and the steam via the gas inlet portion to the interior of the reactor to allow a steam reforming reaction to take place;
allowing the absorbent to absorb carbon dioxide generated with hydrogen at the steam reforming reaction; and
releasing the carbon dioxide from the absorbent after the carbon dioxide absorption capacity of the absorbent is degraded;
wherein temperature in an inside of the reactor is set to 625° C. or more at the release of the carbon dioxide, and an inert gas or a mixed inert gas containing not more than 5% by volume of carbon dioxide is employed as a treatment gas and fed via the discharge portion to the interior of the reactor in a manner that the direction of flow of the treatment gas is opposite to the feeding direction of the feedstock gas and the steam.

2. The method according to claim 1, wherein the feedstock gas and the steam are formed of vapor of aqueous ethanol solution.

3. The method according to claim 1, wherein the reforming catalyst is formed of a structure where catalytic metal fine particles are supported on a support.

4. The method according to claim 1, wherein the reforming catalyst is particles or pellets having the diameter of 2 to 10 mm.

5. The method according to claim 1, wherein the absorbent is lithium silicate.

6. The method according to claim 1, wherein the absorbent is made of a mixture of lithium silicate and an alkaline compound.

7. The method according to claim 1, wherein the absorbent is particles or pellets having the diameter of 2 to 10 mm.

8. The method according to claim 1, wherein a mixing ratio between the reforming catalyst and the absorbent is the range of 1:1 to 1:8 by weight.

9. The method according to claim 1, wherein the temperature in an inside of the reactor is an upper limit to 720° C.

10. The method according to claim 1, wherein the inert gas is selected from the group consisting of nitrogen, argon and helium.

11. The method according to claim 1, wherein a couple of the reactors are juxtaposed, one of the reactors is assigned to perform the steam reforming reaction of the feedstock gas and steam, while the other is assigned to perform the regeneration of absorbent wherein carbon dioxide is released from the absorbent loaded in the other reactor.

* * * * *